United States Patent
Umeda et al.

[11] Patent Number: 5,986,375
[45] Date of Patent: Nov. 16, 1999

[54] ALTERNATOR FOR VEHICLE

[75] Inventors: Atsushi Umeda, Okazaki; Tsutomu Shiga, Nukata-gun; Shin Kusase, Obu, all of Japan

[73] Assignee: Denso Corporation, Kariya, Japan

[21] Appl. No.: 09/084,243

[22] Filed: May 26, 1998

[30] Foreign Application Priority Data

Sep. 26, 1997 [JP] Japan .................................. 9-279751
Apr. 23, 1998 [JP] Japan .................................. 10-115418

[51] Int. Cl.$^6$ ................. H02K 3/48; H02K 3/12
[52] U.S. Cl. .................. 310/180; 310/254; 310/263; 310/184
[58] Field of Search ...................... 310/179, 254, 310/263, 180, 184, 195, 200, 210, 203, 206, 207

[56] References Cited

U.S. PATENT DOCUMENTS

| | | | |
|---|---|---|---|
| 1,822,261 | 9/1931 | Apple | 310/179 |
| 1,826,295 | 10/1931 | Apple | 310/179 |
| 2,928,963 | 3/1960 | Bertsche | 310/168 |
| 4,870,307 | 9/1989 | Kitamura | 310/62 |
| 5,093,591 | 3/1992 | Kitamura | 310/54 |
| 5,097,167 | 3/1992 | Kanayama | 310/201 |
| 5,536,987 | 7/1996 | Hayashi et al. | 310/263 |
| 5,691,590 | 11/1997 | Kawai | 310/180 |
| 5,742,498 | 4/1998 | Taniguchi | 363/145 |

FOREIGN PATENT DOCUMENTS

| | | | |
|---|---|---|---|
| 671 802 | 9/1995 | European Pat. Off. . | |
| 1 465 068 | 3/1967 | France . | |
| 1 005611 | 4/1957 | Germany . | |
| 3704780 A1 | 11/1988 | Germany | H02K 3/04 |
| 89 13 392 | 1/1990 | Germany . | |
| 48-442 | 1/1973 | Japan . | |
| 50-47102 | 4/1975 | Japan | H02K 3/12 |
| 59-159638 | 9/1984 | Japan | H02K 3/24 |
| 62-272836 | 11/1987 | Japan | H02K 3/04 |
| 63-274335 | 11/1988 | Japan | H02K 3/04 |
| 64-5340 | 1/1989 | Japan | H02K 3/12 |
| 3-159549 | 7/1991 | Japan | H02K 19/22 |
| 7-303351 | 11/1995 | Japan | H02K 9/06 |
| 8-205441 | 8/1996 | Japan | H02K 3/12 |
| 8-298756 | 11/1996 | Japan | H02K 15/08 |
| 84/01478 | 4/1984 | WIPO | H02K 49/00 |
| 92/06527 | 4/1992 | WIPO . | |

*Primary Examiner*—Nestor Ramirez
*Assistant Examiner*—Burton Mullins
*Attorney, Agent, or Firm*—Pillsbury Madison & Sutro LLP

[57] ABSTRACT

An alternator for a vehicle includes a stator having a stator core, a stator winding having a first coil-end group and a second coil-end group on the opposite ends of the stator core The alternator further includes a rectifier disposed near the first coil-end group and an air drive unit for cooling the first and second coil-end groups. Because the first coil-end group has a larger surface to be cooled than the second coil-end group, temperature of both coil end groups is controlled so that they become equal.

24 Claims, 8 Drawing Sheets

ALTERNATOR FOR VEHICLE

BACKGROUND OF THE INVENTION

1. Field of the Invention

The present invention relates to the stator arrangement of an alternator driven by an internal combustion engine for a vehicle such as a passenger car, a truck, or a boat.

2. Description of the Related Art

Recently, the number various devices in a vehicle such as safety devices has increased, and thus, the output power of alternators is required to be increased. This also involves an increase in the heat radiation of alternators.

PCT Pat. application 92/06527 discloses a sample of a high power alternator. In this application, U-shaped conductor segments are inserted into slots of the stator core from one end and are welded with one another to form a stator winding. Because the U-shaped conductor segments can be disposed regularly, a high conductor occupation ratio can be provided, thereby increasing the output power.

Another structure for improving the cooling effect of the stator winding is disclosed in JP-U-1-27406. The coil ends of the stator winding is formed flat to increase the surface area of winding to be cooled In these conventional structures, two coil-end groups have the same shape and the same size, and there is no difference in the heat radiation. Because the amount of the cooling air sent to two coil-end groups is different, there is a difference in temperature between two coil-end groups.

For example, in an alternator having a pulley at the front thereof and a rectifier at the rear thereof, the heat of the rectifier heats the cooling air sent to the rear-side coil-end group, causing the temperature of the coil-end group higher than the other.

Moreover, the rear side of the alternator faces an engine and is heated thereby. Thus, the temperature of the cooling air supplied to the rear-side coil-end group may become high according to the location of the alternator in the engine compartment. As a result, the rear-side coil-end group can not be cooled and the temperature thereof become too high.

This causes a temperature rise of the stator winding with an undesirable difference in temperature between two coil-end groups. The temperature difference between two coil-end groups causes a difference in temperature between two housings. If this temperature difference becomes too big, the axis of the rotor may be shifted due to a difference in the thermal expansion thereof, thereby causing magnetic noise and vibration.

SUMMARY OF THE INVENTION

In view of the above problem, the present invention is to provide a new and improved alternator for a vehicle.

The present invention is to provide an alternator which can supply effective cooling air corresponding to a high output power without regard to the heat of the rectifier or location of the alternator.

The present invention provides an alternator in which insufficient cooling of one of two coil-end groups is improved.

The present invention provides an alternator in which an abnormal temperature difference between two coil-end groups can be improved.

The present invention is to provide an alternator in which the temperature of the coil-end group near the rectifier is lowered.

According to the present invention, in an alternator for a vehicle including a stator core with a stator winding which has first and second coil-end groups disposed on opposite ends of the stator core, a rectifier disposed near the first coil-end group, an air drive unit for cooling both coil-end groups, the first coil-end group has a larger surface to be cooled than the second coil-end group.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Alternators for vehicles according to various embodiments of the present invention are described hereafter with reference to the appended drawings.

First Embodiment

FIGS. 1–8 show a first embodiment of the present invention.

Figure 1:
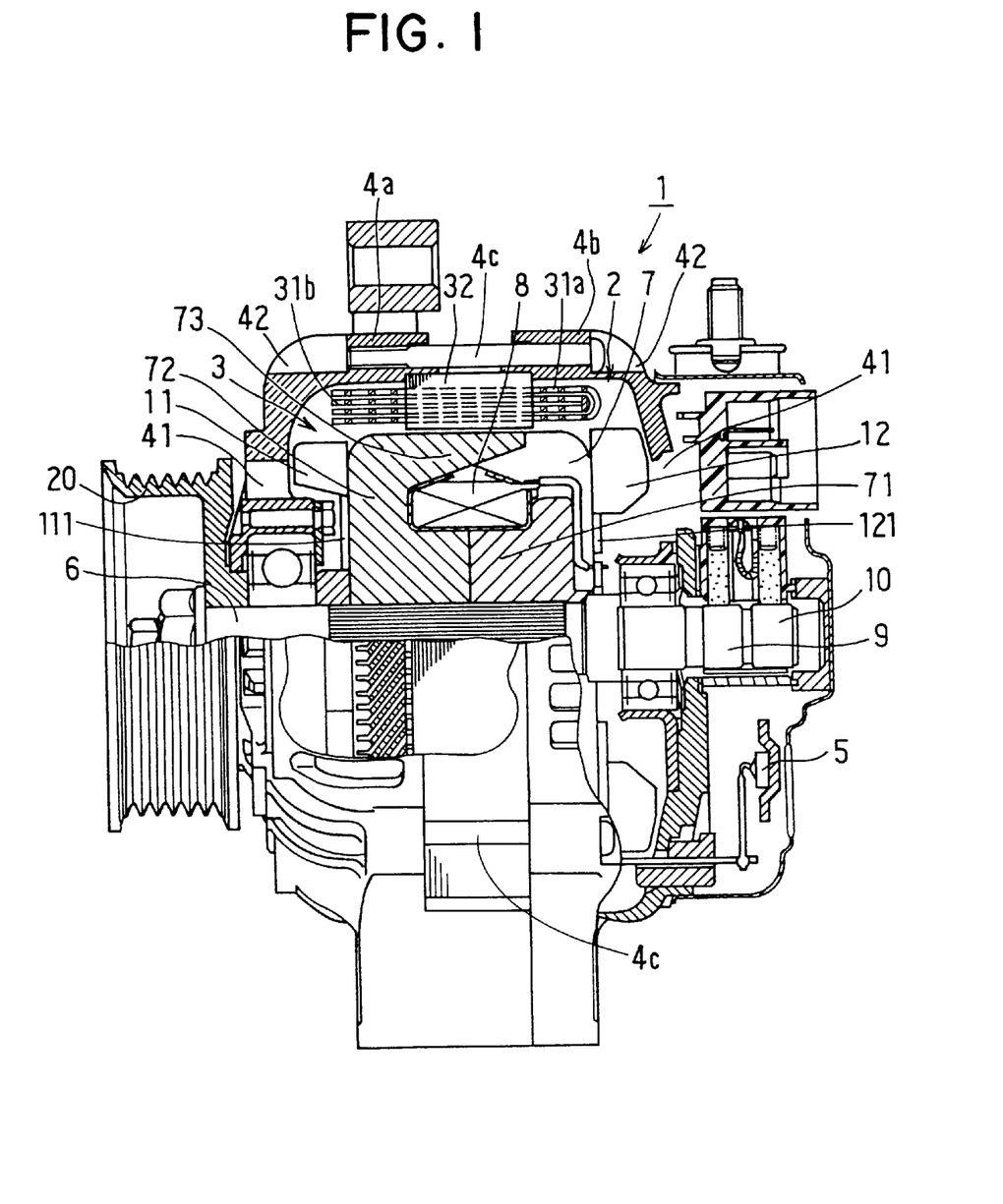
FIG. 1 is a cross-sectional view of an alternator for a vehicle according to a first embodiment of the present invention.

Alternator 1 is composed of stator 2 which functions as an armature, rotor 3 which functions as a magnetic field, front and rear housings 4a, 4b for supporting rotor 3 and stator 2 by screw bolts 4c, and rectifier for converting ac power to dc power.

Rotor 3 rotates together with shaft 6 and is composed of Lundell type pole core 7, field coil 8, slip rings 9, 10 and cooling fans 11, 12. Shaft 6 is linked with pulley 20 to be driven by an engine (not shown) mounted on a vehicle.

Lundell type pole core 7 is composed of a pair of pole core members. Each of the pole core 7 members is composed of boss portion 71 fitted to shaft 6, disk portion 72 extending radially from boss portion 71 and a plurality of claw poles 73.

Pulley-side mixed flow fan 11 has inclined fan blades which are inclined with regard to base plate 111 which is welded to an end pole core 7 and upright fan blades. Centrifugal fan 12 has upright fan blades disposed upright to base plate 121 which is welded to the other end at the counter-pulley-side of pole core 7.

Air intake windows 41 are formed on an axial end of housing 4, and air discharge windows 42 are formed on the shoulder portions of housing 4 opposite to first coil-end group 31a and second coil-end group 31b.

Rectifier 5 is disposed at the counter-pulley side of alternator 1. Thus, first coil-end group 31a is disposed to correspond to rectifier 5.

Figure 2:
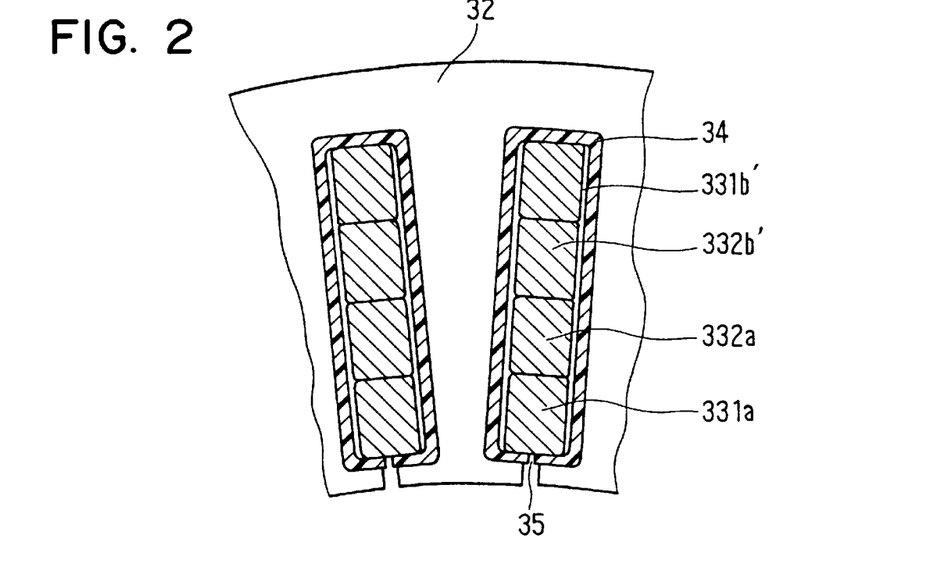
FIG. 2 is a fragmentary view of a stator according to the first embodiment.
Figure 4:
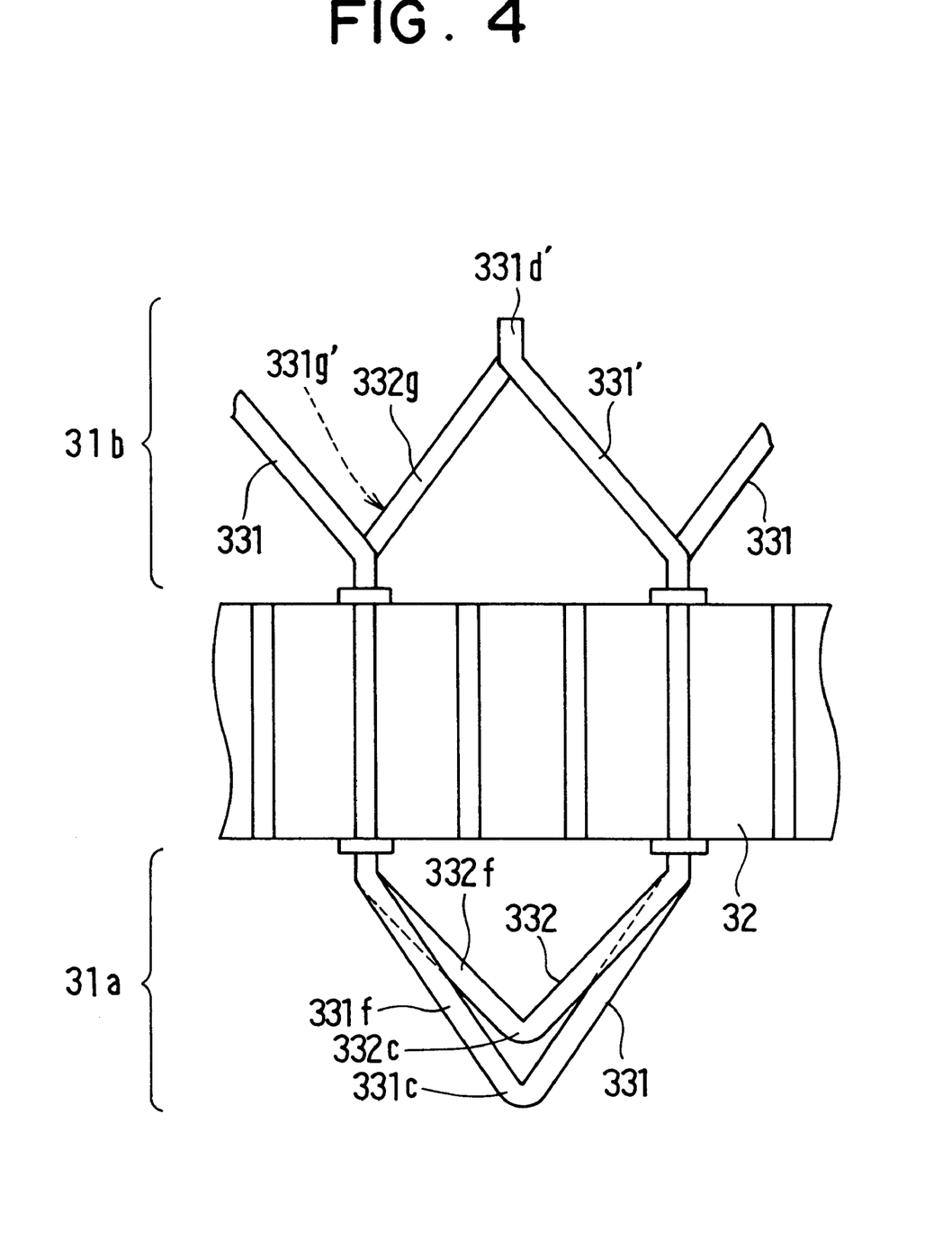
FIG. 4 is a schematic view of segments inserted into stator core according to the first embodiment.

Stator 2 is composed of stator core 32, a stator winding disposed in slots 35 formed in stator core 32 and insulators 34 for insulating the conductor members from stator core 34. FIG. 4 is a schematic view of a phase winding of the stator core 32 viewed from the radially inner side of stator core 32. As shown in FIG. 2, stator core 32 has a plurality of slots 35 to accommodate the conductor members of the multi-phase stator winding. Stator core 32 of this embodiment has 36 slots formed at equal intervals corresponding to the number of poles of rotor 3 in order to accommodate three-phase stator winding.

The stator winding inserted in slots 35 of stator core 32 is composed of each single conductor member. Each of slots 35 has an even number of conductor members (four conductor members according to this embodiment). Four conductor members in each one of slots 35 are aligned in the radial direction of stator core 32 to form an innermost layer, an inner middle layer, an outer middle layer and an outermost layer. The conductor members are connected in a prescribed pattern to form the stator winding. The conductor members in each of slots 35 according to this embodiment extend from opposite ends of stator core 32 to form continuous coil ends at one end thereof and connected coil ends at the other end thereof.

One of the conductor members in one of slots 35 is paired with one of the conductor members in another of slots 35 that is a prescribed pole-pitch spaced apart from the former.

In order to line up conductor members in the coil ends and ensure spaces for insulation and cooling therebetween, one of the conductor members in one layer in one of slots 35 is paired with one of the conductor members in another layer in another of slots 35 that is a prescribed pole-pitch spaced apart from the former.

For example, conductor member 331a in the innermost layer in one of slots 35 is paired with conductor member 331b in the outermost layer in another of slots 35 that is one pole-pitch spaced apart from the former. In the same manner, conductor member 332a in the inner middle layer in one of slots 35 is paired with conductor member 332b in the outer middle layer in another of slots 35 that is one pole-pitch spaced apart from the former in clockwise.

The paired conductor members have continuous U-turn portions 331c, 332c respectively.

Thus, at one end of stator core 32, the continuous U-turn portion of the conductor members disposed in the outermost layer and innermost layer surrounds the continuous U-turn portion of the conductor members in the outer middle layer and the inner middle layer. In other words, one of two U-turn portions of paired conductor members in the same slot surrounds the other of the U-turn portions at one end of stator core 32. The conductor members in the outer middle layer and the conductor members in the inner middle layer form inner coil ends, and the conductor members in the outermost layer and the conductor members in the innermost layer form outer coil ends.

On the other hand, conductor member 332a in the inner middle layer in one of slots 35 is also paired with conductor segment 331a' in the innermost layer in another of slots 35 that is one pole-pitch spaced apart clockwise therefrom. In the same manner, conductor member 331b' in the outermost layer in one of slots 35 is also paired with conductor segment 332b in the outer middle layer in another of slots 35 that is one pole-pitch spaced apart clockwise therefrom. These paired conductor members are respectively welded together at the other end of stator core 32.

Therefore, joint potions of the conductor members in the outermost layer and the conductor members in the outer middle layer and joint portions of the conductor members in the innermost layer and the conductor members in the inner middle layer are aligned in a circumference of the other end of stator 32. The joint portions of the conductor members in the outermost layer and those in the outer middle layer and the joint portions of the conductor members in the innermost layer and those in the inner middle layer form contiguous-layer-coil-ends.

Thus, the paired conductor members are arranged so that the members do not interfere with one another on the other end of stator core 32.

Figure 3:
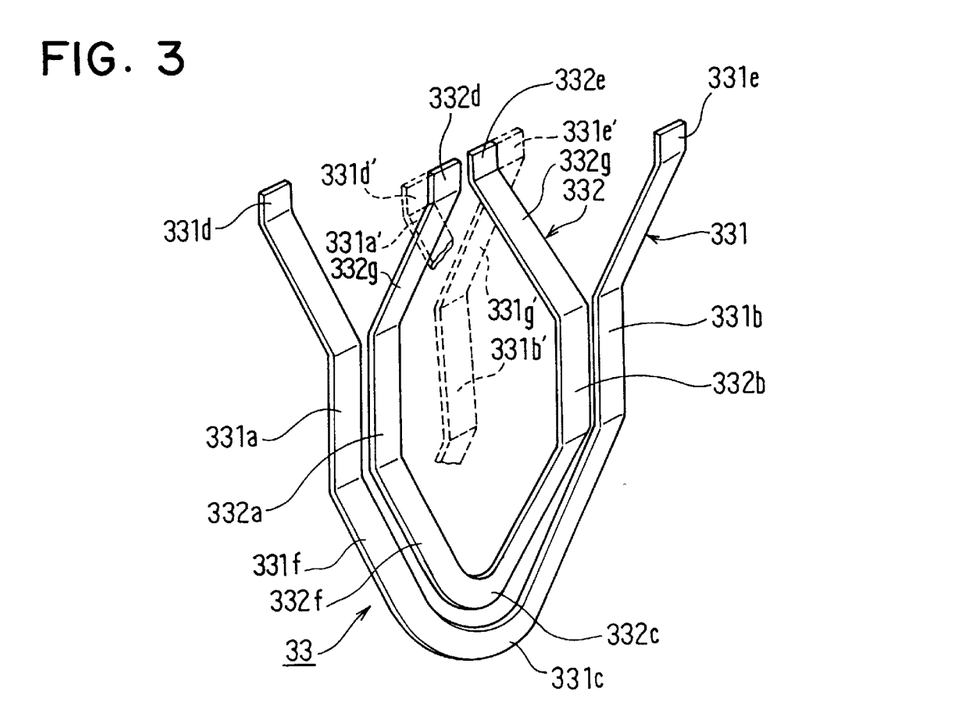
FIG. 3 is a perspective view of conductor segments according to the first embodiment.

Each of the conductor members is a portion of a certain-shaped conductor segment having a rectangular cross-section. As shown in FIG. 3, one of the conductor members in the innermost layer and one of the conductor members in the outermost layer form a large U-shaped conductor segment 331. One of the conductor segments in the inner middle layer and one of the conductor segments in the outer middle layer form a small U-shaped conductor segment 332.

The large and small conductor segments 331, 332 are the base segments 33. The base segments are disposed in the slots in a prescribed rule to form a winding turning two times around stator core 32. Each of the specific segments for terminals of the winding and for connecting the first turn and the second turn of the winding has a specific shape. Three specific segments are necessary in this embodiment. The first turn of the winding and the second turn of the same are connected between the outermost layer and outer middle layer and between the innermost layer and inner middle layer, thus forming specific coil ends.

A manufacturing process of the stator winding is described hereafter. Base segments 33 are disposed so that each of the U-turn portions of U-shaped large segments surrounds one of the U-turn portions 332 of U-shaped small segments 332 and are inserted to the respective slots of stator core 32 from the same side thereof. Conductor members 331a of large segments 331 are disposed in the innermost layer of slots 35, conductor members 332a of small segments 332 are disposed in the inner middle layer, conductor members 331b of large segments 331 are disposed in the outermost layer in the slots which are one pole-pitch spaced apart clockwise from the above-said slots, and conductor members 332b of small segments 332 are disposed in the outer middle layer in the slots which are one pole-pitch spaced apart from the above-said slots 35.

As a result, straight portions of conductor members 331a, 332a, 332b', 331b', are lined up as shown in FIG. 2. Conductor members 332b', 331b' are paired with conductor members of large and small segments disposed in the slot that is one pole-pitch spaced apart therefrom.

Thereafter, in second coil-end group 31b, the conductor members in the outermost layer and the innermost layer are bent to separate from each other so that each of joint portions 331d, 331e is inclined to cover 1.5 slots. The conductor members in the inner middle layer and the outer middle layer are also bent to separate from each other so that each of joint portions 332d, 332e is inclined to cover 1.5 slots.

The above steps are repeated for all conductor segments 33 in slots 35. In second coil-end group 31b, joint portion 331e' of the conductor member in the outermost layer and joint portion 332e of the outer middle layer, and also joint portion 332d of the conductor member in the inner middle layer and joint portion 331d' of the conductor member in the innermost layer are welded by an ultrasonic wave welder or an arc welder, or soldered for electric connection.

U-turn portions 331c of large segment 331 is more distant from stator core 32 than U-turn portions 332c of small segments 332. In other words, first coil-end group 31a is composed of middle-layer-coil ends and both the innermost and outermost coil ends shifted axially from one another, so that the inclination angle of inclined portion 331f of large segments 331 to the slot becomes different from the inclination angle of inclined portion 332f of small segments 332. Accordingly, as shown in FIG. 4, inclined portion 331f of large segments 331 inclined portion 332f of small segments 332 of first coil-end group 31a do not overlap with each other in the radial direction viewed from radially inner side of stator core. In second coil-end group 31b, inclined portion 331g of large segments 331 and inclined portion 332g of small segments 332 as well as two joint portions thereof overlap with each other in the radial direction.

X-phase winding of three phase windings is described with reference to FIGS. 5, 6 and 7. The conductor members in the outermost layer is indicated by one-dot chain lines, those in the outer middle layer is indicated by broken lines, those in the inner middle layer is indicated by solid lines, and those in the innermost layer is indicated by two-dot chain line. First coil-end group 31a is shown on the upper side of the diagrams, and second coil-end group 31b is shown on the lower side of the diagrams. The reference numerals aligned in the center lateral line indicate the slot numbers. This is the same as the other phase-windings.

Figure 5:
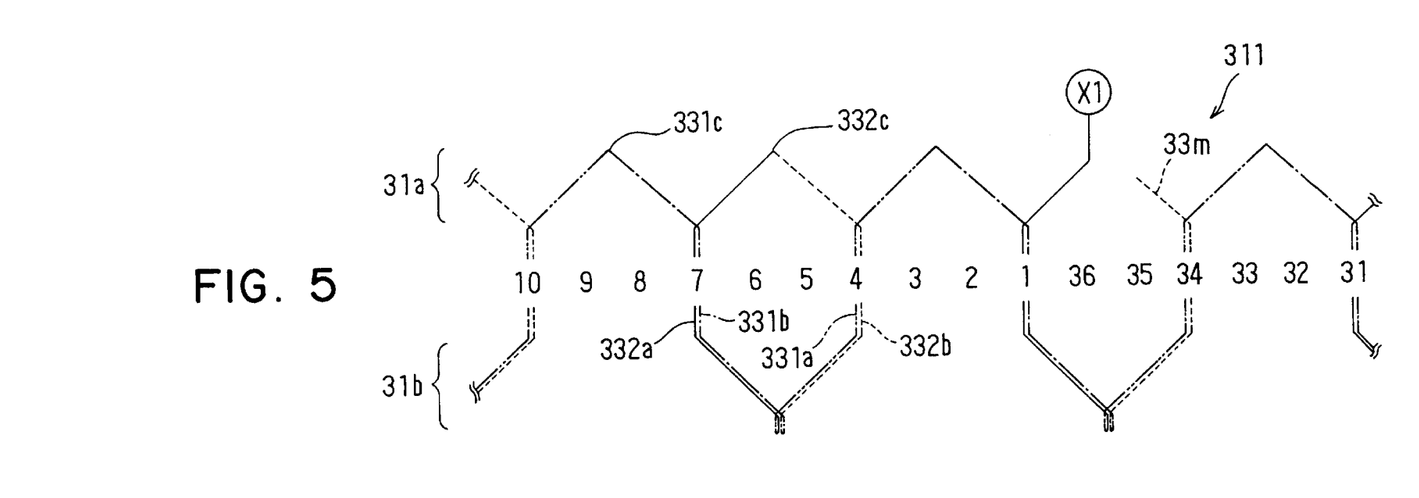
FIG. 5 is a portion of a winding diagram of the stator according to the first embodiment.

As shown in FIG. 5, each of segments 33 is inserted in every fourth slot from slot "1". In second coil-end group 31b, an end of the conductor member extending from the outer middle layer in one of slots 35 is connected to the end of the conductor segment extending from the outermost layer of another of slots 35 spaced apart clockwise one pole-pitch therefrom. An end of the conductor member extending from the innermost layer of one of slots is also connected to the end of the conductor member extending from the inner middle layer in one of slots 35 spaced apart clockwise one pole-pitch therefrom. Thus, first winding 311 is formed to have a two-turn wrap-wound coil each pole.

Figure 6:
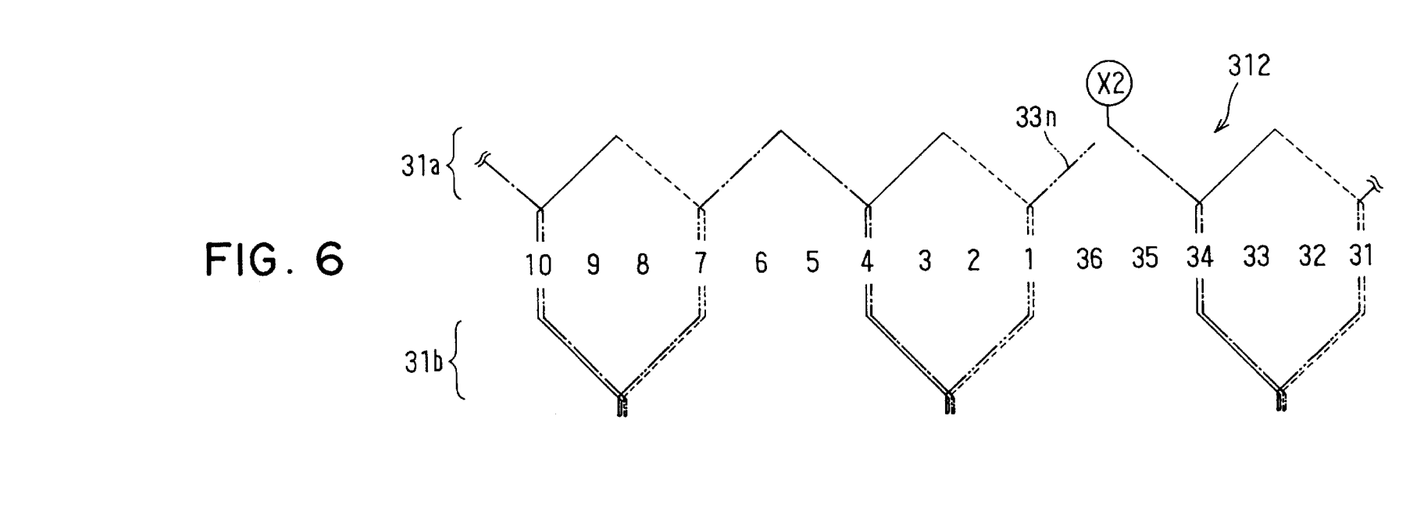
FIG. 6 is a portion of a winding diagram of the stator according to the first embodiment.

Second winding 312 is formed in the same manner as show in FIG 6.

Figure 7:
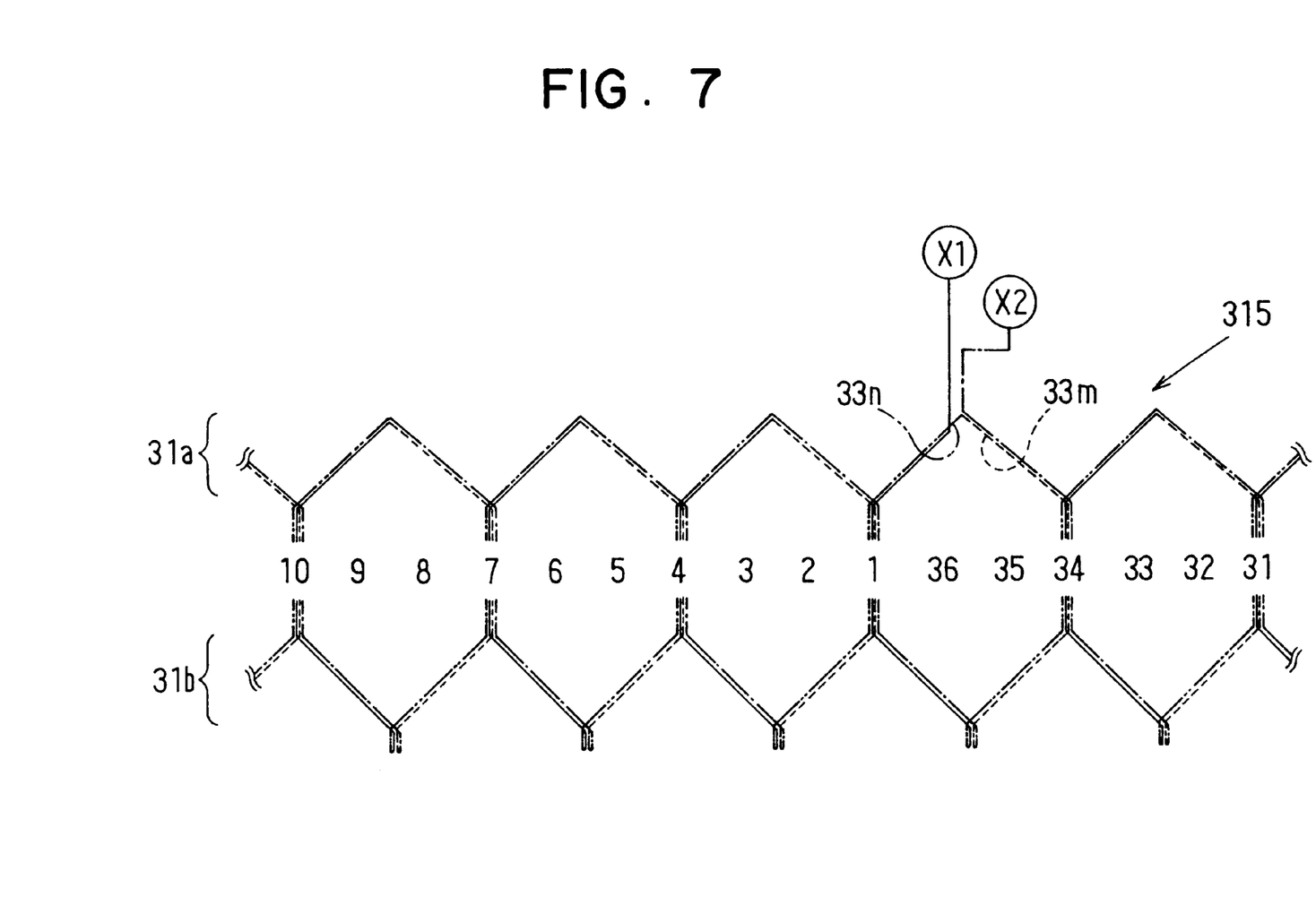
FIG. 7 is a portion of a winding diagram of the stator according to the first embodiment.

Windings 311 and 312 shown in FIGS. 5 and 6, are connected at end 33m of first winding 311 and end 33n of second winding 312 as shown in FIG. 7, thereby forming four-turn winding 315 having four conductor members in one slot.

The conductor segment having joint portion of end 33m of first winding 311 and end 33n of second winding 312 is in shape different from large base segment 311 and small base segment 312.

X-phase winding has three specific segments: the segment having joint portion of end 33m of first winding 331 and end 33n and second winding 332, the segment having terminal X1 and the segment having terminal X2.

Figure 8:
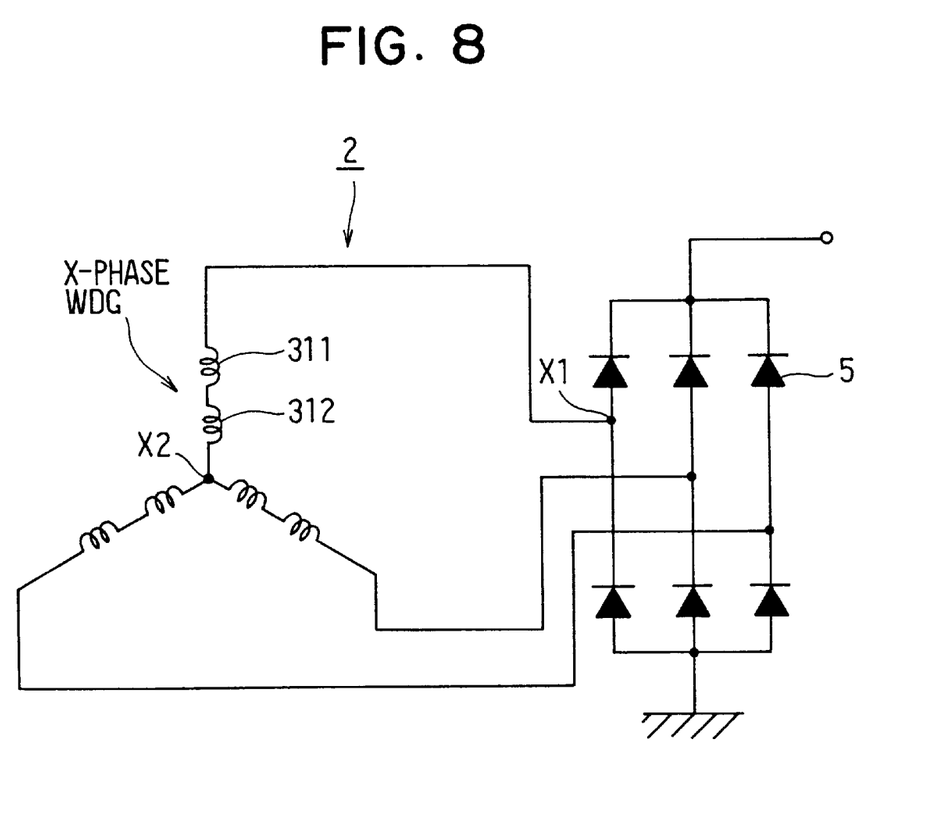
FIG. 8 is a circuit diagram according to the first embodiment.

In the same manner, Y-phase winding and Z-phase winding in those of slots 35 which are 120 degree in angle different from one another are formed. Terminal X1 of X-phase winding as well as, terminals Y1, Z1 of Y-, Z-phase windings are connected to rectifier 5, and terminals X2 and other terminals Y2, Z2 (not shown) are connected together to the neutral point. As shown in FIG. 8, the three phase-windings are connected in the star connection. The winding shown in FIG. 7 has terminal X1 extending axially from the side of first coil-end group 31a to be connected to rectifier 5.

Operation and Effect of the first embodiment

First coil-end group 31a is disposed at the side of rectifier 5 that is opposite to the pulley-side, and second coil-end group 31b is disposed at the pulley-side. As a result, the cooling air sent to first coil-end group 31a by centrifugal fan 12 is already heated by rectifier 5.

Because the inclined portions 331f, 332f of large and small segments 331, 332 in first coil-end portion 31a have different inclined angles as described above, a set of a large and small base segments 33 do not overlap in the radial direction as shown in FIG. 4. Thus, the projected area of first coil-end group 31a viewed from radially inner side of stator core 32 (the area of a shadow of the first coil-end group on an imaginary cylindrical surface projected from radially inner side of the stator core) can be increased so that cooling air can be sent to all the inclined portions. That is, the area to be cooled is increased to cool first coil-end group 31a effectively.

Because mixed flow fan 11 on the side of pulley 20 has inclined blades inclining with respect to the end surface of pole core 7, the blades drive cooling air axially to the counter-pulley-side from the pulley-side where the air temperature is comparatively low. As a result, first coil-end group 31a can be cooled effectively.

Thus, first coil-end group 31a disposed near rectifier 5 can be cooled effectively, and the temperature difference between first coil-end group 31a and second coil-end group 31b can be reduced. Thus, distortion in the housings and in the gap between the rotor and stator due to a difference in the thermal expansion can be prevented, thereby reducing magnetic noise and vibration.

Further, thermal expansion of rear housing 4c at the counter-pulley-side, where the ambient temperature is high, can be prevented so that stator core 32 can be held by the housings tight. As a result, breakage of the terminal wire between the stator winding and the rectifier due to the vibration can be prevented.

Because comparatively cool air can be supplied from the pulley side in the axial direction to the field coil 8, the field coil can be cooled effectively to increase the output power.

Because the stator winding is composed of conductor members aligned in the radial direction in slots 35, the occupation ratio or space factor of the conductor in slots 35 can be increased to increase the output power. Because U-turn portion 332c of small segment 332 is surrounded by U-turn portion 331c of large segments 331 in first coil-end group 31a, the projected area thereof viewed from the radially inner side of stator core 32 can be increased.

Because more than four conductor members are inserted in each of slots 35, the alternator can provide sufficient output power at a low speed range.

Second Embodiment

In the first embodiment, winding 315 has four conductor members in each of slots 35. However, the number of conductor members can be increased as follows.

Figure 9:
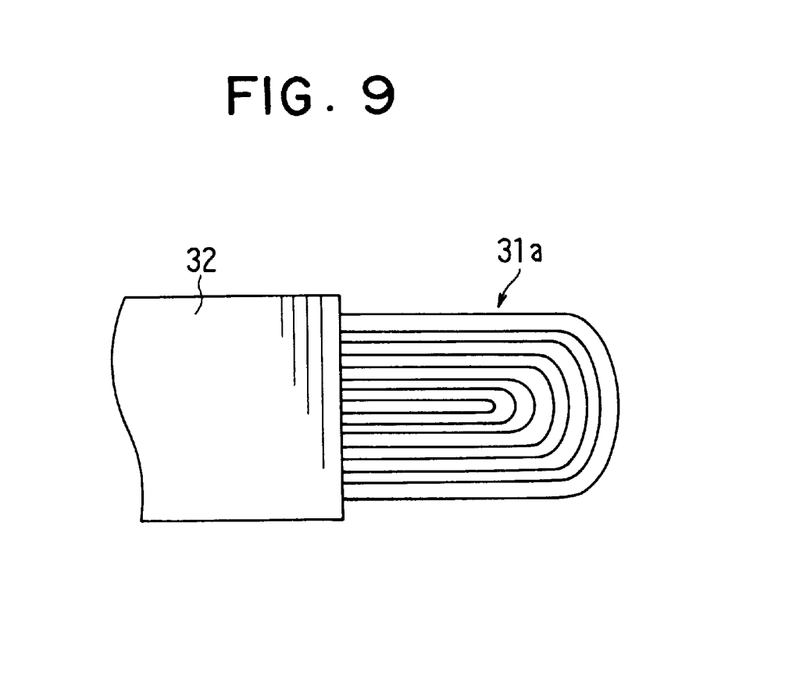
FIG. 9 is a schematic diagram of a first coil-end group of the stator according to a second embodiment of the invention.

FIG. 9 shows a schematic view of first coil-end group in which 8 conductor members are disposed in each slot.

The conductor members disposed in the outer two layers, the conductor members disposed in the inner two layers and two conductor members disposed side by side are combined to form a plurality of the same windings as the first embodiment, and are connected in series.

Figure 10:
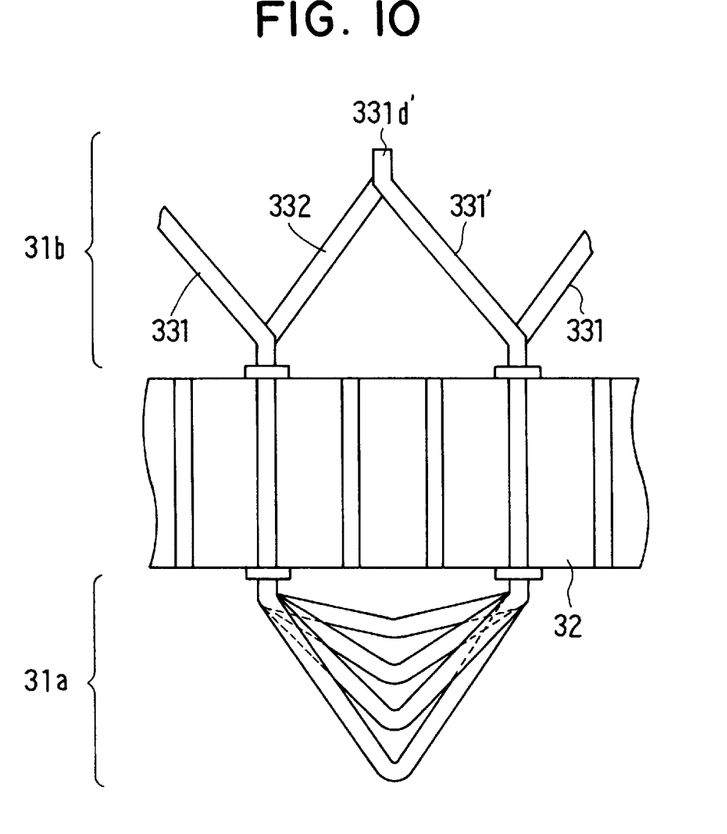
FIG. 10 is a schematic view of segments inserted into stator core according to the second embodiment.

The inclined portions of the respective segments of first coil-end group 31a do not overlap with one another as shown in FIG. 10. In second coil-end group 31b, the four joint portions are in line with one another and four inclined portions overlap with one another in the radial direction. Therefore, the projected area of first coil-end group 31a viewed from the inner side of stator core 32 is larger than that of second coil-end group 31b. The increase in the cooling effect of first coil-end group 31a equalizes the temperature of both first and second coil-end groups 31a, 31b.

Third Embodiment

Instead of the winding according to the first embodiment which has four conductor members in each slot, a stator winding that has six conductor members in each slot can be formed by U-shaped small segments 332, U-shaped middle segment 333 disposed in the radial direction and U-shaped large segment 331 surrounding small and middle segments 332, 333.

Figure 11:
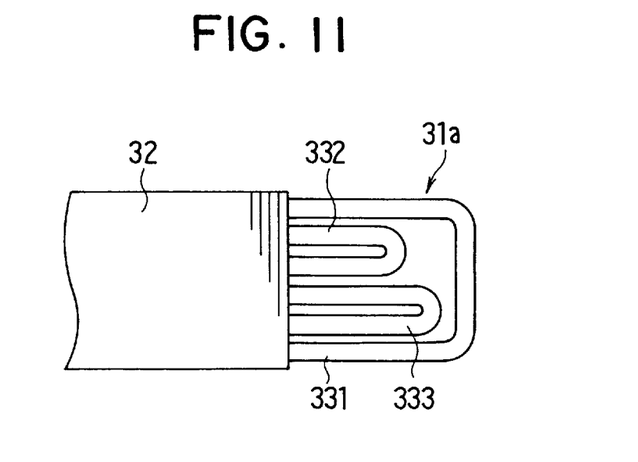
FIG. 11 is a schematic diagram of a first coil-end group of the stator according to a third embodiment of the invention.

FIG. 11 is a schematic diagram showing a portion of first coil-end group 31a which has conductor members disposed respectively in the first from the outermost, second, third, fourth, fifth and sixth layers. Conductor members 331a, 331b' extending from the first and sixth layers form a U-turn portion. Conductor members 332a, 332b' extending the second and third layers and conductor members 333a, 333b' extending from the fourth and fifth layers form respective U-turn portions.

Figure 12:
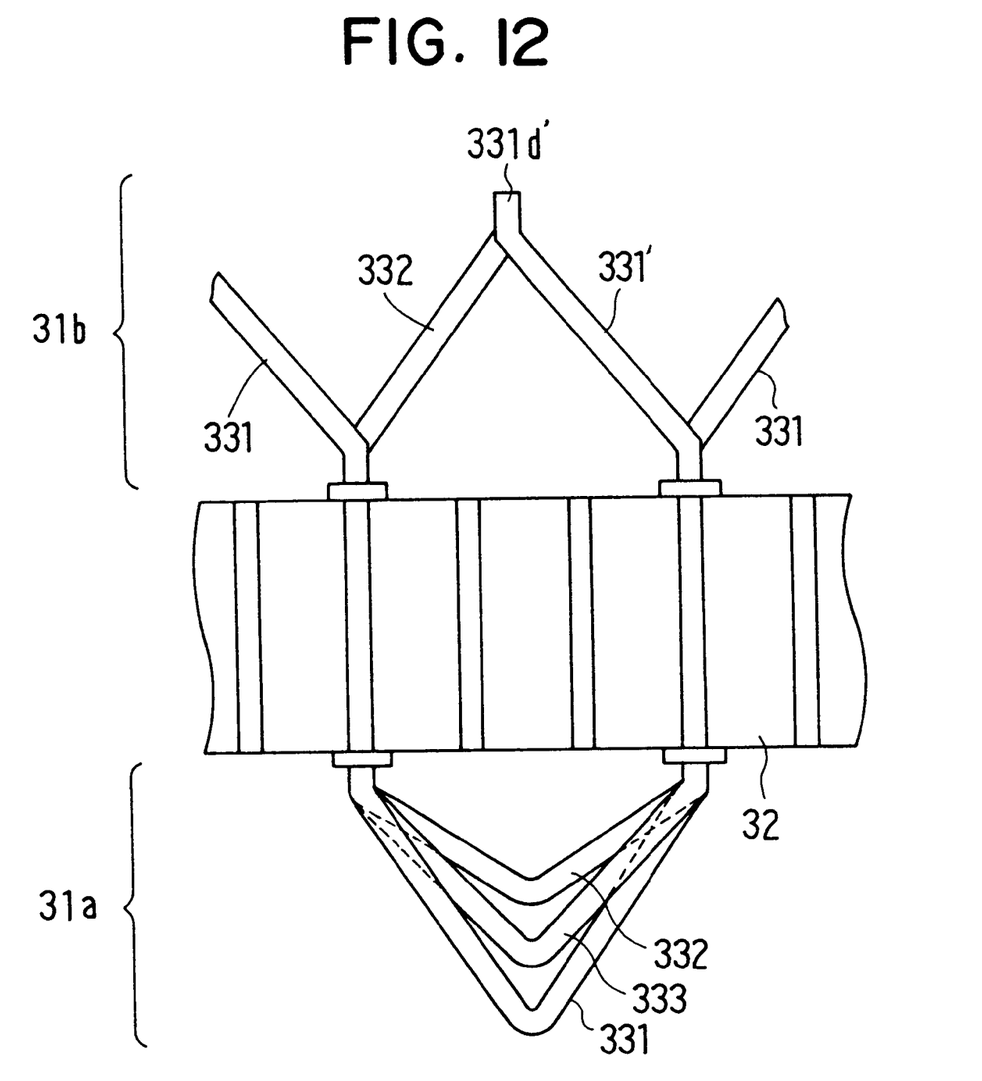
FIG. 12 is a schematic view of segments inserted into stator core according to the third embodiment.

The inclined portions of the respective segments of first coil-end group 31a do not overlap with one another as shown in FIG. 12. In second coil-end group 31b, the four joint portions are in line with one another and four inclined portions overlaps with one another in the radial direction. Therefore, the projected area of first coil-end group 31a viewed from the inner side of stator core 32 is larger than that of second coil-end group 31b. The increase in the cooling effect of first coil-end group 31a equalizes the temperature of both first and second coil-end groups 31a, 31b.

If the number of conductor members in each slot is 6+4N (N is an integer) instead of six conductor members are inserted, the conductor members in the outermost layer and the innermost layer are connected by the U-turn portions.

Other Embodiments

Rod-like segments can be inserted in slots 35 and connected thereafter, instead of U-shaped small segments 332 and U-shaped large segments 331 having continuous U-turn portion 331c surrounding small segments 332. In this case, the winding can be formed by connecting each of the conductor members of both first and second coil-end groups. The joint portions in one coil-end group are disposed on the two circumferences thereof, and the joint portions in the other coil-end group are disposed so that the joint portions of the conductor members in the inner middle layer in the slots and the conductor members in the outer middle layer in the slots are surrounded by the joint portions of the conductor members in the outermost layer and the innermost layer.

Alternatively, the joint portions of the conductor members of the outer middle layer and the conductor members of the inner middle layer in the first coil-end group 31a can be surrounded by the joint portions of the conductor members in the outermost layer and the innermost layer, and the conductor members of the outermost layer and outer middle layer as well as the conductor members of the innermost layer and the inner middle layer in second coil-end group 31b can be connected by continuous wires.

In this case, the projected area of first coil-end group 31a also becomes larger than that of second coil-end group 331b. Therefore, temperature of first and second coil-end groups can be made equal.

The pulley-side fan can have upright blades only or inclined blades only instead of a mixture of the inclined blades and the upright blades if the temperature difference between first coil-end group 31a and second coil-end group 31b and other conditions are suitable.

In the third embodiment, U-shaped small segment 332 and U-shaped middle segment 333 are surrounded by large segment 331. However, two U-shaped small segments 332 can be surrounded by large segment 331. In this case, the U-turn portion of two small segments 332 and the inclined portions thereof overlap with each other in the radial direction in first coil-end group 31a. However, the projected area of first coil-end group 31a can be made larger than that of second coil-end group 31b. Thus, first coil-end group 31a can be cooled effectively so that the temperature difference between first coil-end group 31a and second coil-end group 31b can be made small.

In the above embodiment, rotor 3 has 12 claw poles and stator core 32 has 36 slots can be provided. Even if the number of poles and the slots is changed, the same winding structure as the above embodiments can be provided. For example, the number of the slots can be doubled to have two three-phase windings to have combined output.

In the first embodiment, the terminal wire extends from first coil-end group 31a. However, the terminal wire can be extended from second coil-end group 31b. In this case, the axial height of each of contiguous-layer-coil-ends of second coil-end group 31b can be made different. For example, the contiguous-layer-coil-ends in the inner circumference can be made lower than the contiguous-layer-coil-ends in the outer circumference so that both are shifted from each other in the axial direction.

A stator having a delta-connection of X, Y, Z-windings can be provided instead of the above star-connection of X, Y, Z-windings also. Such a star-connection and a delta-connection can be combined if two or more rectifiers are used.

In the above embodiments, the conductor segments are formed from flat wires. However, round wire can be used if the straight portions of conductor members 331a, 331b, 332a, 332b are formed to be flat.

The stator winding can be used instead of the conductor segments used in the above embodiments. In this case, the coil ends of first coil-end group 31a is made flat so that the area thereof to be cooled becomes larger than that of the second coil-end group 31b or so that the area projected thereof from the radially inner side of the stator core 32 becomes larger than that of second coil-end group 31b. As a result, the temperature of both first and second coil-end groups can be equalized.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An alternator for a vehicle comprising:

a stator having a stator core with a stator winding which has first and second coil-end groups respectively composed of coil ends disposed annularly on opposite ends of said stator core;

a rectifier disposed near said first coil-end groups; and an air drive unit for sending cooling air to said first and second coil-end groups; wherein said first coil-end group has a larger surface to be cooled by said air drive unit than said second coil-end group; and said first coil-end group has at least two coil ends which are shifted in the axial direction from each other.

2. The alternator for a vehicle as claimed in claim 1, wherein a air drive unit is fixed to said rotor and has a first cooling fan disposed on an a end of said rotor close to said first coil-end group and second cooling fan disposed on the other end of said rotor close to said second coil-end group.

3. The alternator claimed in claim 2, wherein said first cooling fan is a centrifugal fan, and said second cooling fan is a mixed-flow fan.

4. The alternator for a vehicle as claimed in claim 3, wherein said stator winding is composed of a plurality of conductor members aligned in said slots to be disposed in inner and outer middle layers and innermost and outermost layers, said first coil-end group has a plurality of inside coil ends for connecting those of said conductor members disposed in one of said middle layers and those of said conductor members disposed in the other of said middle layers a certain pitch spaced apart therefrom and a plurality of outside coil ends for connecting those of conductor members disposed in said innermost layer and those of conductor members disposed in said outermost layers a certain pitch spaced apart therefrom, and said second coil-end group has a plurality of contiguous-layer coil ends for connecting those of said conductor members disposed in said one of middle layer and those of said conductor members disposed in adjacent one of said innermost and outermost layers a certain pitch spaced apart therefrom.

5. The alternator as claimed in claim 4, wherein more than four said conductor members are disposed in each of said slots.

6. The alternator as claimed in claim 1, wherein said stator winding is composed of a plurality of conductor members aligned in said slots to be disposed in inner and outer middle layers and innermost and outermost layers;

said first coil-end group has a plurality of inside coil ends for connecting those of said conductor members disposed in one of said middle layers and those of said conductor members disposed in the other of said middle layers in a certain pitch spaced apart therefrom and a plurality of outside coil ends for connecting those of conductor members disposed in said innermost layer and those of conductor members disposed in said outermost layers a certain pitch spaced apart therefrom; and said second coil-end group has a plurality of contiguous-layer coil ends for connecting those of said conductor members disposed in said one of middle layer and those of said conductor members disposed in adjacent one of said innermost and outermost layers a certain pitch spaced apart therefrom.

7. The alternator as claimed in claim 6, wherein more than four said conductor members are disposed in each of said slots.

8. An alternator for a vehicle comprising:

a stator having a stator core with a stator winding which has first and second coil-end groups respectively composed of coil ends disposed annularly on opposite ends of said stator core;

a rectifier disposed near said first coil-end group; and an air drive unit for sending cooling air to said first and second coil-end groups; wherein said first coil-end group has a larger projected area projected from a radially inner side of said stator core than said second coil-end group; and said first coil-end group has at least two coil ends which are shifted in the axial direction from each other.

9. The alternator as claimed in claim 8, wherein said air drive unit is fixed to a rotor and has a first cooling fan disposed on an end of said rotor close to said first coil-end group and a second cooling fan disposed on the other end of said rotor close to said second coil-end group.

10. The alternator as claimed in claim 9, wherein said first cooling fan is a centrifugal fan, and said second cooling fan is a mixed-flow fan.

11. The alternator as claimed in claim 10, wherein said stator winding is composed of a plurality of conductor members aligned in said slots to be disposed in inner and outer middle layers and innermost and outermost layers;

said first coil-end group has a plurality of inside coil ends for connecting those of said conductor members disposed in one of said middle layers and those of said conductor members disposed in the other of said middle layers in a certain pitch spaced apart therefrom and a plurality of outside coil ends for connecting those of conductor members disposed in said innermost layer and those of conductor members disposed in said outermost layers a certain pitch spaced apart therefrom; and said second coil-end group has a plurality of contiguous-layer coil ends for connecting those of said conductor members disposed in said one of middle layer and those of said conductor members disposed in adjacent one of said innermost and outermost layers a certain pitch spaced apart therefrom.

12. The alternator as claimed in claim 11, wherein more than four said conductor members are disposed in each of said slots.

13. The alternator as claimed in claim 8, wherein said stator winding is composed of a plurality of conductor members aligned in said slots to be disposed in inner and outer middle layers and innermost and outermost layers;

said first coil-end group has a plurality of inside coil ends for connecting those of said conductor members disposed in one of said middle layers and those of said conductor members disposed in the other of said middle layers in a certain pitch spaced apart therefrom and a plurality of outside coil ends for connecting those of conductor members disposed in said innermost layer and those of conductor members disposed in said outermost layers a certain pitch spaced apart therefrom; and said second coil-end group has a plurality of contiguous-layer coil ends for connecting those of said conductor members disposed in said one of middle layer and those of said conductor members disposed in adjacent one of said innermost and outermost layers a certain pitch spaced apart therefrom.

14. The alternator as claimed in claim 13, wherein more than four said conductor members are disposed in each of said slots.

15. An alternator for a vehicle comprising:

a stator having a stator core with a stator winding which has first and second coil-end groups respectively composed of coil ends disposed annularly on opposite ends of said stator core;

a rectifier disposed near said first coil-end groups; and an air drive unit for sending cooling air to said first and second coil-end groups; wherein said first coil-end group has a larger surface to be cooled by said air drive unit than said second coil-end group;

said air drive unit is fixed to a rotor and has a first cooling fan disposed on an end of said rotor close to said first coil-end group and a second cooling fan disposed on the other end of said rotor close to said second coil-end group; and said first cooling fan is a centrifugal fan, and said second cooling fan is a mixed-flow fan.

16. The alternator as claimed in claim 15, wherein said stator winding is composed of a plurality of conductor members aligned in said slots to be disposed in inner and outer middle layers and innermost and outermost layers;

said first coil-end group has a plurality of inside coil ends for connecting those of said conductor members disposed in one of said middle layers and those of said conductor members disposed in the other of said middle layers in a certain pitch spaced apart therefrom and a plurality of outside coil ends for connecting those of conductor members disposed in said innermost layer and those of conductor members disposed in said outermost layers a certain pitch spaced apart therefrom; and said second coil-end group has a plurality of contiguous-layer coil ends for connecting those of said conductor members disposed in said one of middle layer and those of said conductor members disposed in adjacent one of said innermost and outermost layers a certain pitch spaced apart therefrom.

17. The alternator as claimed in claim 16, wherein more than four said conductor members are disposed in each of said slots.

18. An alternator for a vehicle comprising:

a stator having a stator core with a stator winding which has first and second coil-end groups respectively composed of coil ends disposed annularly on opposite ends of said stator core;

a rectifier disposed near said first coil-end group; and an air drive unit for sending cooling air to said first and second coil-end groups; wherein said first coil-end group has a larger projected area projected from a radially inner side of said stator core than said second coil-end group;

said air drive unit is fixed to a rotor and has a first cooling fan disposed on an end of said rotor close to said first coil-end group and a second cooling fan disposed on the other end of said rotor close to said second coil-end group; and said first cooling fan is a centrifugal fan, and said second cooling fan is a mixed-flow fan.

19. The alternator as claimed in claim 18, wherein said stator winding is composed of a plurality of conductor members aligned in said slots to be disposed in inner and outer middle layers and innermost and outermost layers;

said first coil-end group has a plurality of inside coil ends for connecting those of said conductor members disposed in one of said middle layers and those of said conductor members disposed in the other of said middle layers in a certain pitch spaced apart therefrom and a plurality of outside coil ends for connecting those of conductor members disposed in said innermost layer and those of conductor members disposed in said outermost layers a certain pitch spaced apart therefrom; and said second coil-end group has a plurality of contiguous-layer coil ends for connecting those of said conductor members disposed in said one of middle layer and those of said conductor members disposed in adjacent one of said innermost and outermost layers a certain pitch spaced apart therefrom.

20. The alternator as claimed in claim 19, wherein more than four said conductor members are disposed in each of said slots.

21. An alternator for a vehicle comprising:

a stator having a stator core with a stator winding which has first and second coil-end groups respectively composed of coil ends disposed annularly on opposite ends of said stator core;

a rectifier disposed near said first coil-end groups; and an air drive unit for sending cooling air to said first and second coil-end groups; wherein said first coil-end group has a larger surface to be cooled by said air drive unit than said second coil-end group;

said stator winding is composed of a plurality of conductor members aligned in said slots to be disposed in inner and outer middle layers and innermost and outermost layers;

said first coil-end group has a plurality of inside coil ends for connecting those of said conductor members disposed in one of said middle layers and those of said conductor members disposed in the other of said middle layers in a certain pitch spaced apart therefrom and a plurality of outside coil ends for connecting those of conductor members disposed in said innermost layer and those of conductor members disposed in said outermost layers a certain pitch spaced apart therefrom; and said second coil-end group has a plurality of contiguous-layer coil ends for connecting those of said conductor members disposed in said one of middle layer and those of said conductor members disposed in adjacent one of said innermost and outermost layers a certain pitch spaced apart therefrom.

22. The alternator as claimed in claim 21, wherein more than four said conductor members are disposed in each of said slots.

23. An alternator for a vehicle comprising:

a stator having a stator core with a stator winding which has first and second coil-end groups respectively composed of coil ends disposed annularly on opposite ends of said stator core;

a rectifier disposed near said first coil-end group; and an air drive unit for sending cooling air to said first and second coil-end groups; wherein said first coil-end group has a larger projected area projected from a radially inner side of said stator core than said second coil-end group;

said stator winding is composed of a plurality of conductor members aligned in said slots to be disposed in inner and outer middle layers and innermost and outermost layers;

said first coil-end group has a plurality of inside coil ends for connecting those of said conductor members disposed in one of said middle layers and those of said conductor members disposed in the other of said middle layers in a certain pitch spaced apart therefrom and a plurality of outside coil ends for connecting those of conductor members disposed in said innermost layer and those of conductor members disposed in said outermost layers a certain pitch spaced apart therefrom; and said second coil-end group has a plurality of contiguous-layer coil ends for connecting those of said conductor members disposed in said one of middle layer and those of said conductor members disposed in adjacent one of said innermost and outermost layers a certain pitch spaced apart therefrom.

24. The alternator as claimed in claim 23, wherein more than four said conductor members are disposed in each of said slots.

* * * * *